US011772217B2

(12) United States Patent
Kamio et al.

(10) Patent No.: US 11,772,217 B2
(45) Date of Patent: Oct. 3, 2023

(54) CONVEYANCE CHAIN, TOOL CHANGE SYSTEM AND MULTIPLE LINK PLATES

(71) Applicant: TSUBAKIMOTO CHAIN CO., Osaka (JP)

(72) Inventors: Tatsuya Kamio, Osaka (JP); Tomoyuki Koyama, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 288 days.

(21) Appl. No.: 17/289,337

(22) PCT Filed: Dec. 27, 2018

(86) PCT No.: PCT/JP2018/048140
§ 371 (c)(1),
(2) Date: Apr. 28, 2021

(87) PCT Pub. No.: WO2020/136801
PCT Pub. Date: Jul. 2, 2020

(65) Prior Publication Data
US 2021/0394322 A1    Dec. 23, 2021

(51) Int. Cl.
*B23Q 3/157*    (2006.01)
*B23Q 3/155*    (2006.01)

(52) U.S. Cl.
CPC .......... *B23Q 3/15724* (2016.11); *B23Q 3/157* (2013.01); *B23Q 3/15526* (2013.01);
(Continued)

(58) Field of Classification Search
CPC ......... Y10T 483/1864; Y10T 483/1873; Y10T 483/1891; B23Q 3/15526; B23Q 3/157;
(Continued)

(56) References Cited

U.S. PATENT DOCUMENTS 4,541,533 A * 9/1985 Uemura ................... F16G 13/06
483/68
6,428,454 B1 * 8/2002 Yokota ............... B23Q 3/15724
483/68
(Continued)

FOREIGN PATENT DOCUMENTS

CN    102205504 A    10/2011
DE      2059688 A1 *  6/1972 ............. B23Q 3/157
(Continued)

OTHER PUBLICATIONS

International Search Report dated Apr. 9, 2019, issued in counterpart International Application No. PCT/ JP2018/048140 (2 pages).

*Primary Examiner* — Erica E Cadugan
*Assistant Examiner* — Michael Vitale
(74) *Attorney, Agent, or Firm* — WHDA, LLP

(57) ABSTRACT

A conveyance chain comprises a plurality of link plates alternately coupled and conveying plural tool pots each holding a tool. The plurality of link plates include an inner link plate and an outer link plate each including a rotation stop hole that stops a rotation of the tool pot and a rotation permit hole located upstream from the rotation stop hole with respect to a conveyance direction that permits a rotation of the tool pot. The plurality of tool pots includes a first tool pot and a second tool pot, the first tool pot is inserted through a rotation stop hole of the inner link plate and a rotation permit hole of the outer link plate, and adjacent to the first tool pot, the second tool pot is inserted through a rotation permit hole of the inner link plate and a rotation stop hole of the outer link plate.

5 Claims, 7 Drawing Sheets

(52) U.S. Cl.
CPC .............. *B23Q 2003/15527* (2016.11); *B23Q 2003/15532* (2016.11); *Y10T 483/1809* (2015.01); *Y10T 483/1864* (2015.01); *Y10T 483/1891* (2015.01)

(58) Field of Classification Search
CPC ...... B23Q 3/15724; B23Q 2003/15532; B23Q 3/15726–3/15766; B65G 17/40
USPC .............................. 483/65, 66, 68; 211/1.56
See application file for complete search history.

(56) References Cited

U.S. PATENT DOCUMENTS

| | | | |
|---|---|---|---|
| 8,814,771 B2 | 8/2014 | Koyama et al. | |
| 2002/0137612 A1* | 9/2002 | Oitaka | B23Q 3/1554 483/68 |
| 2005/0143238 A1* | 6/2005 | Sakuragi | B23Q 3/15724 483/65 |
| 2011/0245053 A1 | 10/2011 | Koyama et al. | |
| 2016/0108990 A1 | 4/2016 | Yokoyama | |
| 2017/0028522 A1 | 2/2017 | Scheidegger et al. | |

FOREIGN PATENT DOCUMENTS

| | | | | | |
|---|---|---|---|---|---|
| DE | 3926496 | A1 | * | 3/1990 | ......... B23Q 3/15526 |
| JP | 57127642 | A | * | 8/1982 | ......... B23Q 3/15724 |
| JP | 58059742 | A | * | 4/1983 | ......... B23Q 3/15724 |
| JP | 62-4122 | A | | 1/1987 | |
| JP | 63-76437 | U | | 5/1988 | |
| JP | 2007-144587 | A | | 6/2007 | |
| JP | 2008036780 | A | * | 2/2008 | |
| JP | 2011-212769 | A | | 10/2011 | |
| JP | 2016198879 | A | * | 12/2016 | |
| JP | 2017-24169 | A | | 2/2017 | |
| JP | 2019-18266 | A | | 2/2019 | |
| KR | 20110071251 | A | * | 6/2011 | ............ B23Q 3/157 |
| TW | 201438831 | A | | 10/2014 | |
| TW | I529288 | B | | 4/2016 | |

\* cited by examiner

CONVEYANCE CHAIN, TOOL CHANGE SYSTEM AND MULTIPLE LINK PLATES

CROSS-REFERENCE TO RELATED APPLICATIONS

This application is the national phase under 35 U.S.C. § 371 of PCT International Application No. PCT/JP2018/048140 which has International filing date of Dec. 27, 2018 and designated the United States of America.

FIELD

The technology herein relates to a conveyance chain for conveying tools, a tool change system for changing tools conveyed by the conveying chain and multiple link plates.

BACKGROUND AND SUMMARY

A conveyance chain has conventionally been proposed that is composed of multiple outer link plates each having throughholes on both ends and multiple inner link plates each having throughholes on both ends and that conveys tools held in tool pots such that the tool pots are inserted in the respective throughholes of the outer link plates and the inner link plates to couple them one another.

The inner link plate and the tool pot can relatively rotate around the axis. Each of the two throughholes of the outer link plate is formed with a flat portion while the outer periphery of a tool pot is also formed with a flat portion.

The tool pot is inserted through the respective throughholes of the outer link plate and the inner link plate with the flat portion of the outer link plate and the flat portion of the tool pot aligned.

The flat portion of the outer link plate and the flat portion of the tool pot are engaged, so that the outer link plate and the tool pot cannot relatively rotate around the axis. The tool pot is positioned around the axis.

The conveyance chain is laid across a sprocket, and a tool change device is placed near the sprocket. In the case where the throughhole of an outer link plate and a tool pot are placed at a position where the conveyance chain and the sprocket are engaged, that is, where a change position at which tools are changed, change of tools is executed.

At the tool change position, the outer link plate rotates around the axis of the throughhole by the rotation of the sprocket and bends. Since the outer link plate and the tool pot cannot relatively rotate around the axis, the tool pot inserted in this throughhole and a tool held in the tool pot rotate together with the outer link plate. This causes a misalignment in the position of the tool around the axis when the tool moves from the position before it reaches the change position. If a tool is misaligned around the axis, a malfunction may occur at the time of changing tools. For example, a tool may be misaligned around the axis relative to a spindle.

It is an object to provide an aspect of disclosure of a conveyance chain, a tool change system and multiple link plates that can reduce a misalignment of a tool at a tool change position.

According to an aspect of disclosure, there is provided a conveyance chain comprising a plurality of link plates alternately coupled and conveying a plurality of tool pots each holding a tool, and the plurality of link plates include an inner link plate and an outer link plate each including a rotation stop hole that stops a rotation of the tool pot and a rotation permit hole located upstream from the rotation stop hole with respect to a conveyance direction that permits a rotation of the tool pot, the plurality of tool pots includes a first tool pot and a second tool pot, the first tool pot is inserted through a rotation stop hole of the inner link plate and a rotation permit hole of the outer link plate, and adjacent to the first tool pot, the second tool pot is inserted through a rotation permit hole of the inner link plate and a rotation stop hole of the outer link plate.

In the conveyance chain according to an aspect of the disclosure, the plurality of link plates include a second inner link plate and a second outer link plate that are respectively opposed to the inner link plate and the outer link plate, each of the second inner link plate and the second outer link plate includes a second rotation permit hole that permits a rotation of the tool pot, and the tool pot inserted through the rotation stop hole and the rotation permit hole is inserted through the respective second rotation permit holes of the second inner link plate and the second outer link plate.

The conveyance chain according to an aspect of the disclosure further comprises a pin that is movable in an axial direction of the tool pot and is attached to the tool pot at a predetermined position in a circumferential direction of the tool pot such that the pin is opposed to a detection unit or an operation unit that is provided at a position spaced from the tool pot.

A tool change system according to an aspect of the disclosure comprises a conveyance chain described above; a sprocket across which the conveyance chain is laid; and a change device that changes a tool conveyed by the conveyance chain, and the change device changes, when a tool pot inserted through a rotation stop hole of the inner link plate and a rotation permit hole of the outer link plate is placed on a periphery of the sprocket, the tool held in the tool pot.

The plurality of link plates according to an aspect of the disclosure are a plurality of link plates forming of a conveyance chain to convey a plurality of tool pots holding tools, and the plurality of link plates include an inner link plate and an outer link plate each including a rotation stop hole that stops a rotation of the tool pot and a rotation permit hole located upstream from the rotation stop hole with respect to a conveyance direction that permits a rotation of the tool pot, a first tool pot is inserted through a rotation stop hole of the inner link plate and a rotation permit hole of the outer link plate, and adjacent to the first tool pot, a second tool pot is inserted through a rotation permit hole of the inner link plate and a rotation stop hole of the outer link plate.

In the disclosure, in the case where the conveyance chain is laid across the sprocket, and the inner link plates and the outer link plates travel around the sprocket, the outer link plate rotates around the rotation permit hole. The first tool pot is inserted through the rotation stop hole of the inner link plate, so that the first tool pot and the inner link plate do not relatively rotate. Meanwhile, the first tool pot is inserted in the rotation permit hole of the outer link plate, so that the first tool pot and the outer link plate relatively rotate. The first tool pot is stopped to rotate by the rotation stop hole, whereby the first outer link plate independently rotates without rotating the first tool pot.

Moreover, the inner link plate also rotates around the rotation permit hole. The second tool pot is inserted through the rotation stop hole of the outer link plate, so that the second tool pot and the outer link plate do not relatively rotate. Meanwhile, the second tool pot is inserted through the rotation permit hole of the inner link plate, so that the second tool pot and the inner link plate relatively rotate. The second tool pot is stopped to rotate by the rotation stop hole, whereby the inner link plate independently rotates without rotating the second tool pot.

In the disclosure, there is no need to provide the second inner link plate and the second outer link plate with the respective rotation stop holes. The formation of the rotation permit hole is easier than that of the rotation stop hole, which can reduce manufacturing costs. If the second inner link plate and the second outer link plate are formed with respective rotation stop holes, this necessitates accurate positioning between the formed rotation stop holes and the rotation stop holes of the inner link plate and the outer link plate. The present discloser eliminates the need for accurate positioning.

In the disclosure, the change in phase around the axis of the tool pot is prevented, which keeps the phase of the tool pot unchanged with respect to the detection unit or the operation unit fixed at a position spaced from the tool pot in the case where the conveyance chain travels around the sprocket. The phase of the pin attached to the tool pot is also unchanged, which causes no misalignment between the pin and the detection unit or the operation unit, capable of keeping the pin opposite to the detection unit or the operation unit.

In the disclosure, in the case where the conveyance chain travels around the sprocket, the phase of the tool pot around the axis is not changed. This makes the phase of the tool held in the tool pot unchanged, which can prevent a misalignment between the change device, e.g., the hand and the tool, achieving a smooth change of tools.

In the conveyance chain, the tool change system and multiple link plates according to the present discloser, in the case where the conveyance chain is laid across the sprocket, and the inner link plates and the outer link plates travel around the sprocket, the outer link plate rotates around the rotation permit hole. The first tool pot is inserted through the rotation stop hole of the inner link plate, so that the first tool pot and the inner link plate do not relatively rotate. Meanwhile, the first tool pot is inserted through the rotation permit hole of the outer link plate, so that the first tool pot and the outer link plate relatively rotate. The first tool pot is stopped to rotate by the rotation stop hole, whereby the first outer link plate independently rotates without rotating the first tool pot.

Moreover, the inner link plate also rotates around the rotation permit hole. The second tool pot is inserted through the rotation stop hole of the outer link plate, so that the second tool pot and the outer link plate do not relatively rotate. Meanwhile, the second tool pot is inserted through the rotation permit hole of the inner link plate, so that the second tool pot and the inner link plate relatively rotate. The second tool pot is stopped to rotate by the rotation stop hole, whereby the inner link plate independently rotates without rotating the second tool pot. This makes it possible to prevent a change in phase around the axis of each of the tool pots.

The above and further objects and features will more fully be apparent from the following detailed description with accompanying drawings.

DETAILED DESCRIPTION OF NON-LIMITING EXAMPLE EMBODIMENTS

Embodiment 1

Figure 1:
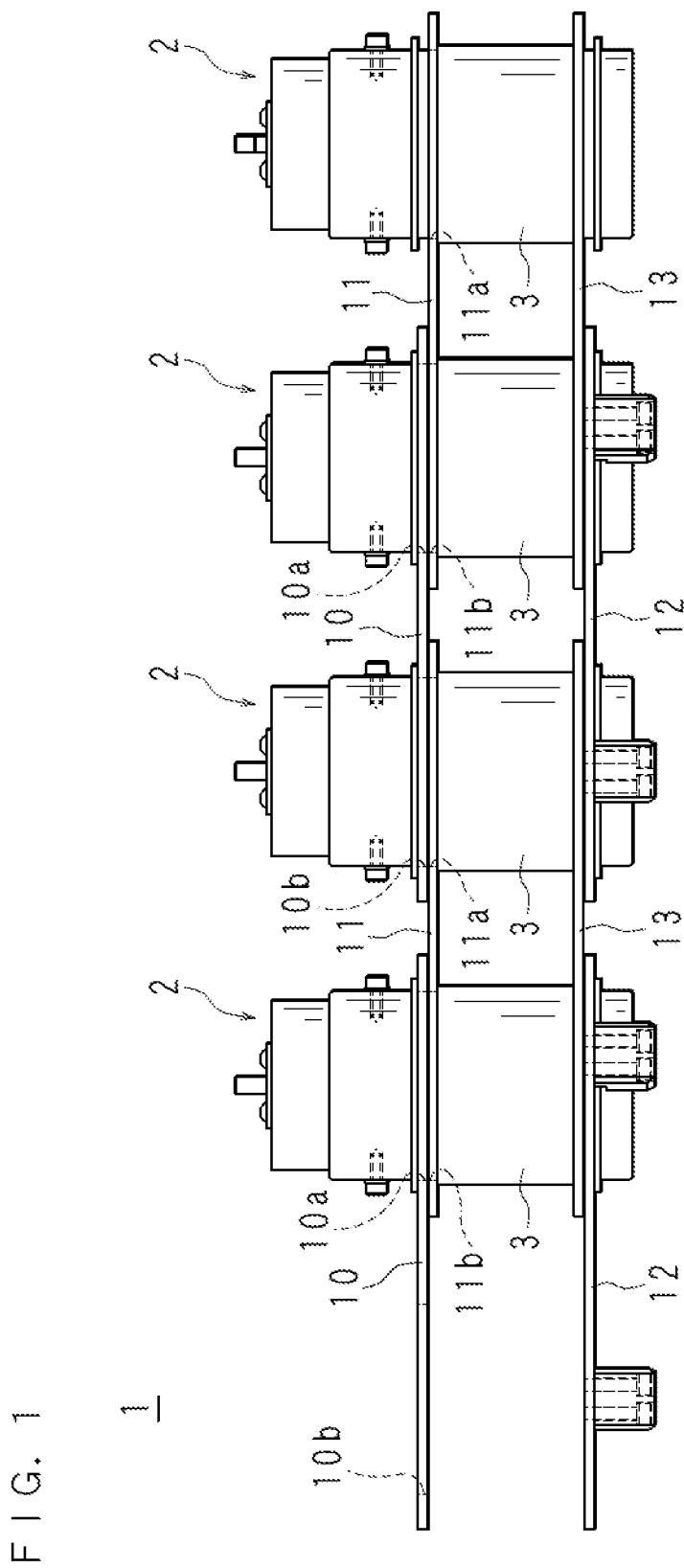
FIG. 1 is a plan view schematically illustrating a conveyance chain according to Embodiment 1.
Figure 2:
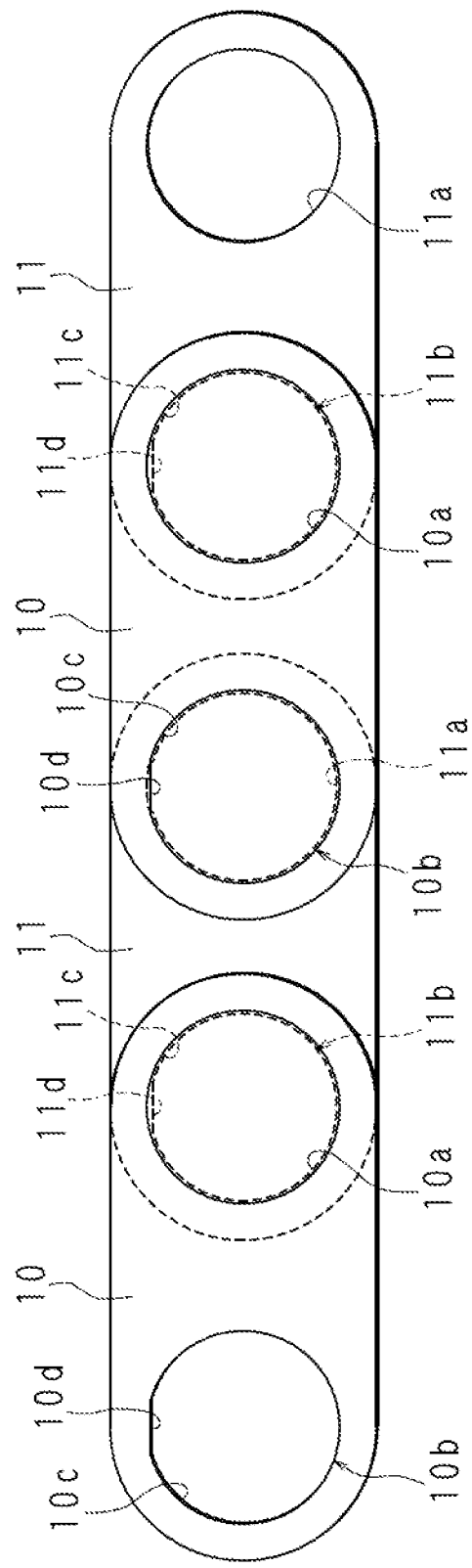
FIG. 2 is a rear view schematically illustrating first outer link plates and first inner link plates.
Figure 3:
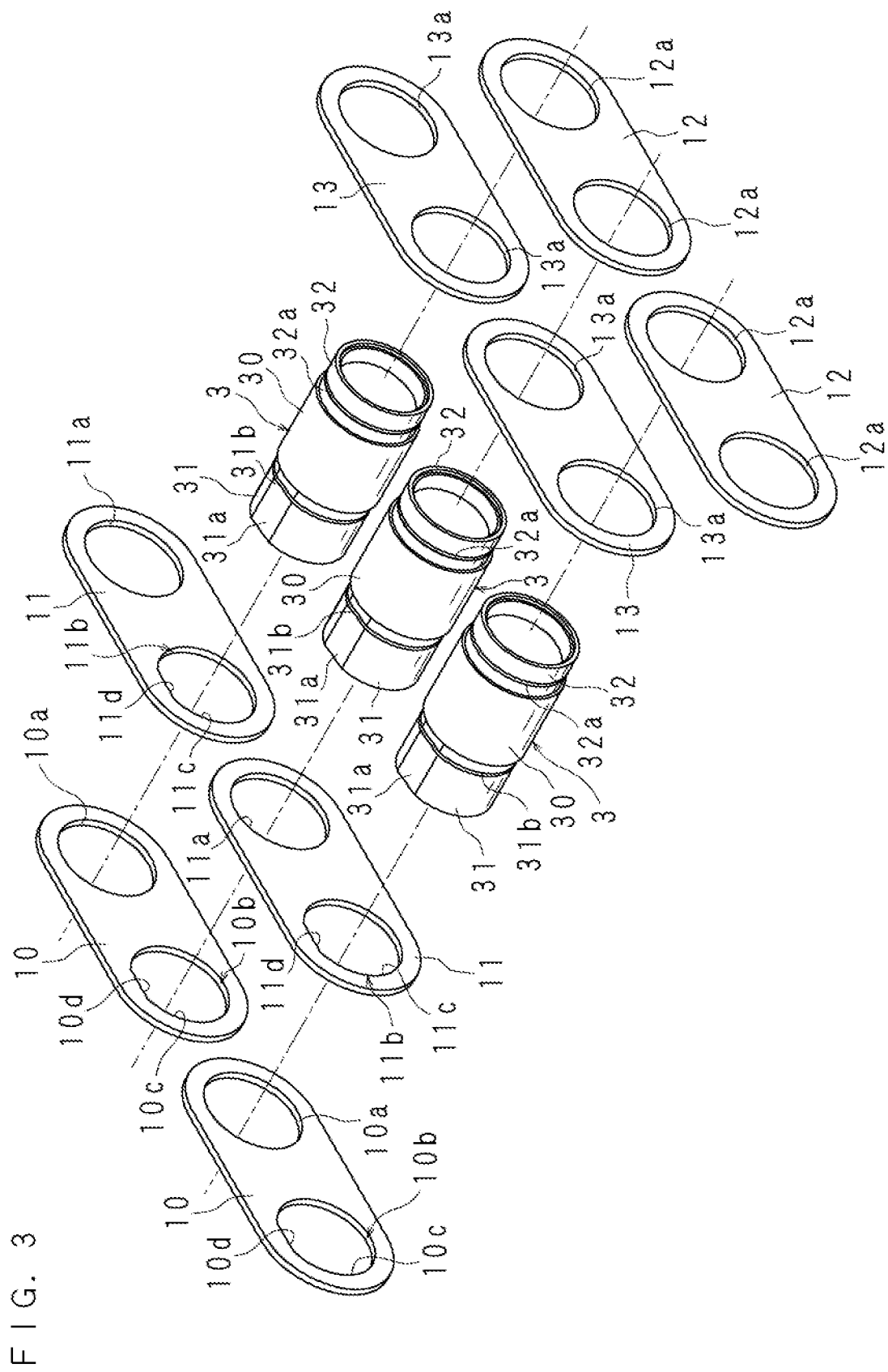
FIG. 3 is an exploded perspective view schematically illustrating the first outer link plates, the first inner link plates, second outer link plates, second inner link plates and cylinders.

A present invention will be described below with reference to the drawings illustrating a conveyance chain 1 and a tool change system according to Embodiment 1. FIG. 1 is a plan view schematically illustrating a conveyance chain 1, FIG. 2 is a rear view schematically illustrating first outer link plates 10 and first inner link plates 11, and FIG. 3 is an exploded perspective view schematically illustrating the first outer link plates 10, the first inner link plates 11, second outer link plates 12, second inner link plates 13 and cylinders 3.

The conveyance chain 1 includes multiple first outer link plates 10 each having an oblong shape. Each of the first outer link plates 10 has a rotation permit hole 10a that penetrates through the first outer link plate 10 at one end thereof and permits rotation of a tool pot 2 to be described later and a rotation stop hole 10b that penetrates through the first outer link plate 10 at the other end thereof and stops the rotation of the tool pot 2. The first outer link plates 10 are annularly arranged (see FIGS. 5 and 6). The direction in which the multiple plates are arranged is also referred to as a circumferential direction. For the two first outer link plates and 10 arranged adjacent to each other in the circumferential direction, the rotation permit hole 10a of one of the first outer link plates 10 and the rotation stop hole 10b of the other one of the first outer link plates 10 are adjacent to each other.

The conveyance chain 1 includes multiple first inner link plates 11 each having an oblong shape. Each of the first inner link plates 11 has a rotation permit hole 11a that penetrates through the first inner link plate 11 at one end thereof and permits rotation of the tool pot 2 to be described later and has a rotation stop hole 11b that penetrates through the first inner link plate 11 at the other end thereof and stops the rotation of the tool pot 2. The first inner link plates 11 are annularly arranged. For the two first inner link plates 11 and 11 arranged adjacent to each other in the circumferential direction, the rotation permit hole 11a of one of the first inner link plates 11 and the rotation stop hole 11b of the other one of the first inner link plates 11 are adjacent to each other.

The rotation permit hole 10a of the first outer link plate 10 has a circular shape. The rotation stop hole 10b has a partially-cut-away circular shape and includes an arc portion 10c and a chord portion 10d. The radius of the rotation permit hole 10a and the distance from the center of the rotation stop hole 10b to the arc portion 10c have substantially the same length. The radius of the rotation permit hole 10a is longer than the distance from the center of the rotation stop hole 10b to the midpoint of the chord portion 10d.

The rotation permit hole 11a of the first inner link plate 11 has a circular shape. The rotation stop hole 11b has a partially-cut-away circular shape and includes an arc portion 11c and a chord portion 11d. The radius of the rotation permit hole 11a and the distance from the center of the rotation stop hole 11b to the arc portion 11c have substantially the same length. The radius of the rotation permit hole 11a is longer than the distance from the center of the rotation stop hole 11b to the midpoint of the chord portion 11d.

The first outer link plates 10 and the first inner link plates 11 are disposed in parallel with each other and are placed in a staggered manner. Both ends of the first inner link plate 11 are opposed to one end of one of the two circumferentially-adjacent first outer link plates 10 and 10 and an end of the other one of the two first outer link plates 10 and 10 in a direction perpendicular to the plates, respectively. The one end of the one of the first outer link plates 10 butts against an end of the other one of the first outer link plates 10. The rotation permit hole 10a of the first outer link plate and the rotation stop hole 11b of the first inner link plate 11 are coaxially disposed while the rotation stop hole 10b of the first outer link plate 10 and the rotation permit hole 11a of the first inner link plate 11 are coaxially disposed.

The conveyance chain 1 includes multiple second outer link plates 12 each having an oblong shape. Each of the second outer link plates 12 has rotation permit holes 12a that penetrate through the first outer link plate 12 on both ends. The second outer link plates 12 are annularly arranged. One end of one of the two circumferentially-adjacent second outer link plates 12 and 12 butts against an end of the other one of the second outer link plates 12 and 12.

The conveyance chain 1 includes multiple second inner link plates 13 each having an oblong shape. Each of the second inner link plates 13 has rotation permit holes 13a that penetrate through the second inner link plate 13 on both ends. The second inner link plates 13 are annularly arranged. One end of one of the two circumferentially-adjacent second inner link plates 13 and 13 butts against an end of the other one of the second inner link plates 13 and 13.

The second outer link plates 12 and the second inner link plates 13 are disposed in parallel with each other and are placed in a staggered manner. Both ends of the second inner link plate 13 are opposed to one end of one of the two circumferentially-adjacent second outer link plates 12 and 12 and an end of the other one of the two second outer link plates 12 and 12 in a direction perpendicular to the plates. The rotation permit hole 12a formed at a first end of the second outer link plate 12 and the rotation permit hole 13a formed at a second end of the second inner link plate 13 are coaxially disposed. The rotation permit hole 12a formed at the second end of the second outer link plate 12 and the rotation permit hole 13a formed at the first end of the second inner link plate 13 are coaxially disposed. It is noted that the first end of the second outer link plate 12 and the second inner link plate 13 are positioned on the same side, e.g., on the left side of FIG. 3, for example. The second end of the second outer link plate 12 and the second inner link plate 13 are positioned on the same side, e.g., the right side of FIG. 3, for example.

The first inner link plate 11 and the second inner link plate 13 face each other in a direction perpendicular to the plates. The two rotation permit holes 13a formed on both ends of the second inner link plate 13 and the rotation stop hole 11b and the rotation permit hole 11a formed on both ends of the first inner link plate 11 are coaxially disposed, respectively.

The two rotation permit holes 12a and 12a formed on both ends of the second outer link plate 12 and the rotation stop hole 10b and the rotation permit hole 10a formed on both ends of the first outer link plate 10 are coaxially disposed, respectively.

A tool pot 2 holding a tool is inserted through the rotation permit hole 10a of the first outer link plate 10 as well as the rotation stop hole 11b of the first inner link plate 11 and the rotation permit holes 12a and 13a of the second outer link plate 12 and the second inner link plate 13 that are coaxially disposed. Moreover, a tool pot 2 is inserted through the rotation stop hole 10b of the first outer link plate 10 as well as the rotation permit holes 11a, 12a and 13a of the first inner link plate 11, the second outer link plate 12 and the second inner link plate 13 that are coaxially disposed.

Tool pots 2 are inserted through all the rotation permit holes 10a-13a or the rotation stop holes 10b and 11b of the first outer link plates 10, the first inner link plates 11, the second outer link plates 12 and the second inner link plates 13. The first outer link plates 10, the first inner link plates 11, the second outer link plates 12 and the second inner link plates 13 are coupled by the tool pots 2 endlessly.

Figure 4:
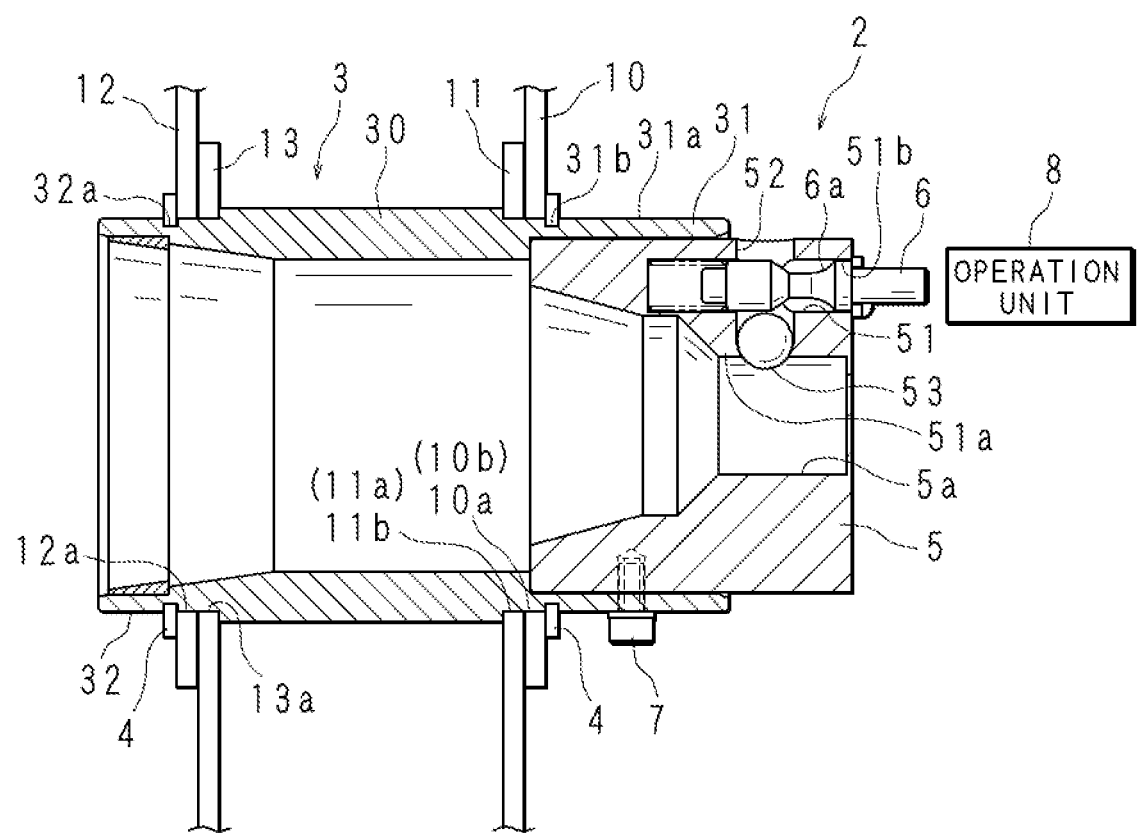
FIG. 4 is a cross-sectional view schematically illustrating a tool pot.

FIG. 4 is a cross-sectional view schematically illustrating the tool pot 2. The tool pot 2 includes a cylinder 3. The cylinder 3 has a large diameter portion 30 at its axially central portion and is coaxially formed with a first small diameter portion 31 being smaller in diameter than the large diameter portion 30 at one end portion of the large diameter portion 30 and with a second small diameter portion 32 being smaller in diameter than the large diameter portion 30 at the other end portion. The first small diameter portion 31 is longer than the second small diameter portion 32 in the axial direction. The first small diameter portion 31 and the second small diameter portion 32 substantially have the same diameter.

A flat surface 31a axially extending on a part of the first small diameter portion 31 is formed. The width of the flat surface 31a in a direction perpendicular to the axial direction is substantially the same as the length of the chord portions 10d and 11d of the rotation stop holes 10b and 11b. The radius from the periphery of the first small diameter portion 31 except for the flat surface 31a is substantially the same as the radius of the rotation permit holes 10a-13a and the radius of the rotation stop holes 10b and 11b at the arc portion. The shortest distance from the flat surface 31a to the center of the first small diameter portion 31 is substantially the same as the distance from the center of the rotation stop holes 10b and 11b to the midpoint of the chord portions 10d and 11d.

The radius from the periphery of the second small diameter portion 32 is substantially the same as the radius of the rotation permit holes 10a-13a. The first small diameter portion 31 and the second small diameter portion 32 are respectively formed with grooves 31b and 32a at their axially middle parts.

The first small diameter portion 31 is inserted through the rotation stop hole 11b of the first inner link plate 11 such that the flat surface 31a is aligned with the chord portion 11d and progressively inserted through the rotation permit hole 10a of the first outer link plate 10. The first inner link plate 11 and the first outer link plate 10 are disposed between the groove 31b and the large diameter portion 30. A retaining ring 4 is fit into the groove 31b, so that the first inner link plate 11 and the first outer link plate 10 are held between the retaining ring 4 and the large diameter portion 30.

The first small diameter portion 31 is inserted through the rotation permit hole 10a of the first outer link plate 10, so that the first small diameter portion 31 and the first outer link plate 10 are relatively rotatable. The first small diameter portion 31 is inserted through the rotation stop hole 11b of the first inner link plate 11, so that the first small diameter portion 31 and the first inner link plate 11 are not relatively rotatable.

The second small diameter portion 32 is progressively inserted from the rotation permit hole 13a of the second inner link plate 13 to the rotation permit hole 12a of the second outer link plate 12. The second inner link plate 13 and the second outer link plate 12 are disposed between the groove 32a and the large diameter portion 30. A retaining ring 4 is fit into the groove 32a, so that the second inner link plate 13 and the second outer link plate 12 are held between the retaining ring 4 and the large diameter portion 30.

The second small diameter portion 32 is inserted through the rotation permit hole 13a of the second inner link plate 13 and the rotation permit hole 12a of the second outer link plate 12, so that the second small diameter portion 32 and the second inner link plate 13 as well as the second outer link plate 12 are relatively rotatable.

In the description above, the first small diameter portion 31 is inserted through the rotation stop hole 11b of the first inner link plate 11 and the rotation permit hole 10a of the first outer link plate 10. Meanwhile, adjacent to the rotation stop hole 11b of the first inner link plate 11 and the rotation permit hole 10a of the first outer link plate 10, the first small diameter portion 31 is inserted through the rotation permit hole 11a of the first inner link plate 11 and the rotation stop hole 10b of the first outer link plate 10. In this case, the first small diameter portion 31 is inserted through the rotation permit hole 11a of the first inner link plate 11, so that the first small diameter portion 31 and the first inner link plate 11 are relatively rotatable. The first small diameter portion 31 is inserted through the rotation stop hole 10b of the first outer link plate 10, so that the first small diameter portion 31 and the first outer link plate 10 are not relatively rotatable.

A holding barrel 5 is inserted through the first small diameter portion 31. The holding barrel 5 is fastened to the first small diameter portion 31 by a bolt 7. The holding barrel 5 is formed with a first hole 51 that axially extends and a second hole 52 that intersects the first hole 51 at its middle part. The first hole 51 is located at a position radially spaced from the axis of the tool pot 2 and has an opening 51b on the opposite side of the second small diameter portion 32. The second hole 52 penetrates through an inner peripheral surface 5a of the holding barrel 5. The diameter of the second hole 52 at an edge portion 51a on the inner peripheral surface 5a side is smaller than the diameter of the second hole 52 at other part.

A pin 6 is inserted to the first hole 51. The pin 6 is formed with a concave portion 6a at its middle part thereof. The concave portion 6a is formed over the entire circumference of the pin 6. An end portion of the pin 6 projects from the opening 51b. The pin 6 is axially movable. The second hole 52 stores a ball 53 therein. The ball 53 is located closer to the inner peripheral surface 5a than the pin 6. The diameter of the ball 53 is larger than that of the edge portion 51a of the second hole 52 but smaller than the diameter of the other part of the second hole 52. A part of the ball 53 can thus project from the edge portion 51a toward the inside of the inner peripheral surface 5a without falling toward the inner peripheral surface 5a.

The end portion of the pin 6 is opposed to an operation unit 8. The operation unit 8 is provided at a position spaced from the tool pot 2. The operation unit 8 can push or pull the pin 6. When the pin 6 is pulled to place the ball 53 between a part of the pin 6 except for the concave portion 6a and the edge portion 51a, the ball 53 is pushed by the part except for the concave portion 6a of the pin 6 to cause a part of the ball 53 to project toward the inside of the inner peripheral surface 5a. When the pin 6 is pushed to place the ball 53 between the concave portion 6a and the edge portion 51a, the press of the pin 6 against the ball 53 is released to allow the ball 53 to move through the second hole 52.

A tool holder (not illustrated) holding a tool is inserted to the tool pot 2 from the second small diameter portion 32 side. Here, the operation unit 8 pushes the pin 6. At an edge of the tool holder, a pull stud is provided so as to be located at an opposite position to the second hole 52. The ball 53 is movable and is thus not engaged with the pull stud. When the operation unit 8 pulls the pin 6, the ball 53 is pushed by a part of the pin 6 except for the concave portion 6a so as to engage with the pull stud.

If the tool holder is removed from the tool pot 2, the operation unit 8 pushes the pin 6 to release the press of the pin 6 against the ball 53. The engagement between the pin 6 and the ball 53 is released to cause the tool holder to come off from the tool pot 2.

Figure 5:
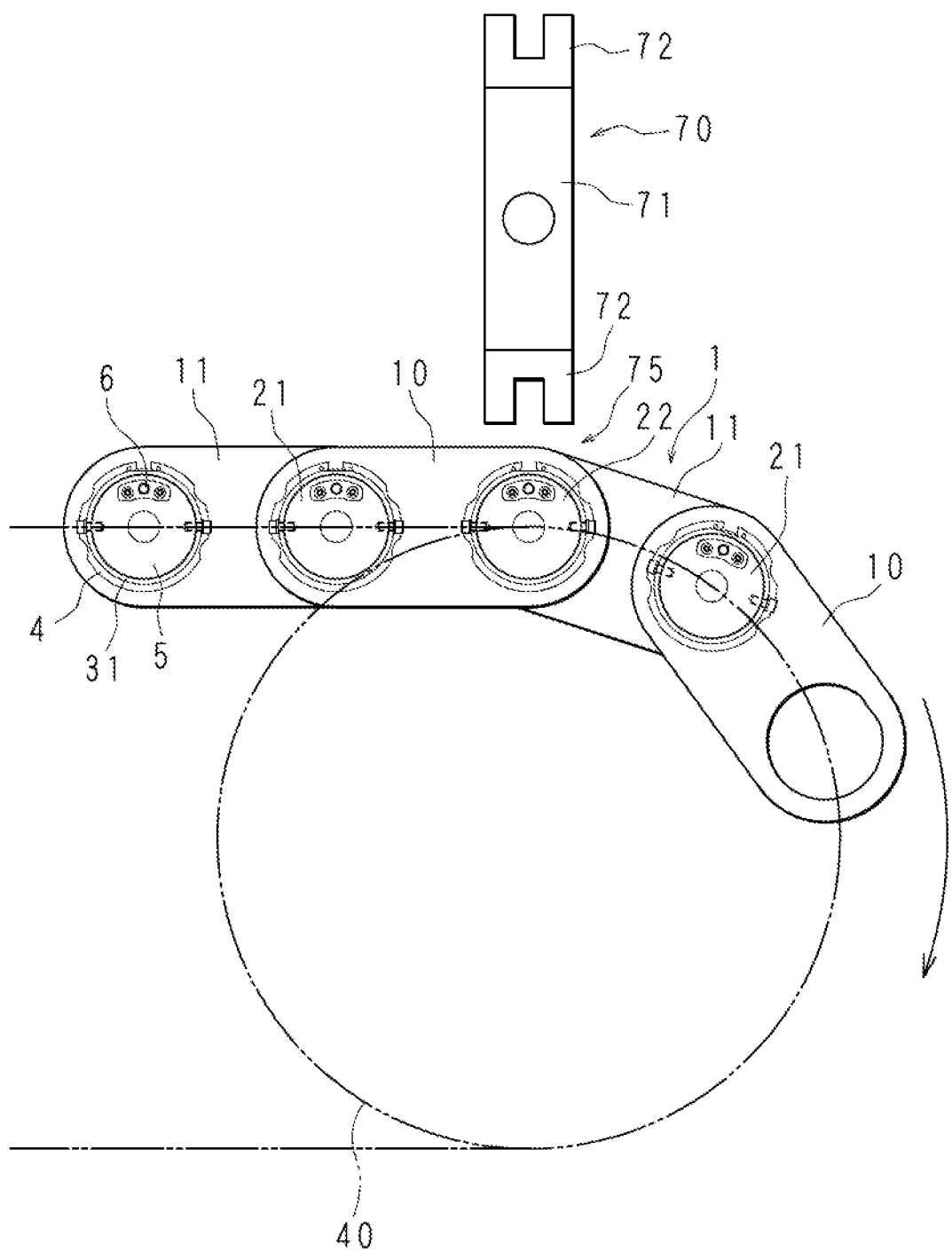
FIG. 5 is a rear view schematically illustrating a tool change system including a conveyance chain, a sprocket and a tool change device.
Figure 6:
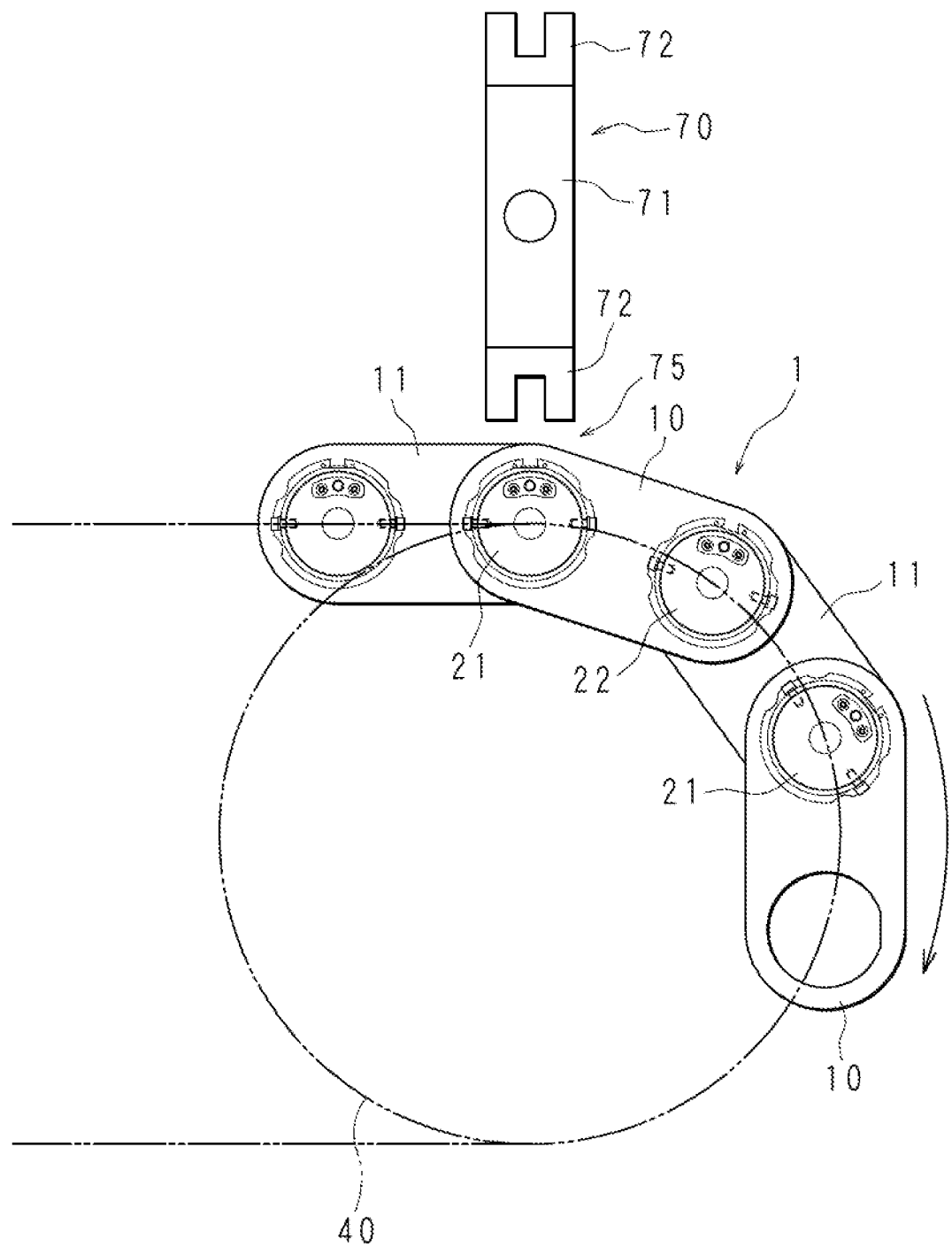
FIG. 6 is a rear view schematically illustrating the tool change system including the conveyance chain, the sprocket and the tool change device.

FIGS. 5 and 6 are rear views each schematically illustrating a tool change system including the conveyance chain 1, a sprocket 40 and a tool change device 70. FIG. 5 shows a state in which the rotation stop hole 10b of the first outer link plate 10 is placed at a change position 75 while FIG. 6 shows a state in which the rotation permit hole 10a of the first outer link plate 10 is placed at the change position 75. Arrows in FIGS. 5 and 6 show a conveyance direction of the tool pot 2.

The conveyance chain 1 is laid across the periphery of the sprocket 40. The tool change device 70 is disposed so as to be opposed to a position where the conveyance chain 1 and the sprocket 40 start to be engaged (hereinafter referred to as the change position 75). The tool change device 70 is provided with a rod 71 that rotates around its central portion in the longitudinal direction as a support, for example, and hands 72 attached on both sides of the rod 71. The hands 72 hold tool holders. Both of the hands 72 hold a tool holder conveyed by the conveyance chain 1 and a tool holder attached to a spindle (not illustrated) and change the tools by a rotation of the rod 71.

The rotation stop hole 10b of the first outer link plate 10 is placed downstream from the rotation permit hole 10a of the first outer link plate 10 with respect to the conveyance direction. In the following description, the tool pot 2 inserted through the rotation permit hole 10a of the first outer link plate 10 is referred to as a first tool pot 21 while the tool pot 2 inserted through the rotation stop hole 10b of the first outer link plate 10 is referred to as a second tool pot 22.

As illustrated in FIG. 5, if the rotation stop hole 10b of the first outer link plate 10 and the second tool pot 22 are placed in the change position 75, the first outer link plate 10 is placed tangentially with respect to the sprocket 40. In the change position 75, the second tool pot 22 is inserted through the rotation stop hole 10b, so that the second tool pot 22 and the first outer link plate 10 are not relatively rotatable. On the other hand, the second tool pot 22 is inserted through the rotation permit holes 11a, 12a and 13a of the first inner link plate 11, the second outer link plate 12 and the second inner link plate 13, so that the second tool pot 22 and the first inner link plate 11, the second outer link plate 12 as well as the second inner link plate 13 are relatively rotatable.

As illustrated in FIG. 5, the first inner link plate 11 and the second inner link plate 13 that are located downstream from the change position 75 bend regarding the second tool pot 22 placed at the change position 75 as a support. In other words, the first inner link plate 11 and the second inner link plate 13 independently rotate while the second tool pot 22 itself does not rotate.

Meanwhile, the first outer link plate 10 located upstream from the change position 75 does not bend by the rotation stop hole 10b while the second outer link plate 12 that is cooperative with the first outer link plate 10 does not also bend.

As illustrated by the arrow in FIG. 6, if the sprocket 40 and the conveyance chain 1 rotate to place the rotation permit hole 10a of the first outer link plate 10 and the first tool pot 21 in the change position 75, the first tool pot 21 is inserted through the rotation permit holes 10a, 12a and 13a of the first outer link plate 10, the second outer link plate 12 and the second inner link plate 13 and the rotation stop hole 11b of the first inner link plate 11 in the change position 75.

The first outer link plate 10 and the second outer link plate 12 that are located downstream from the change position 75 bend regarding the first tool pot 21 as a support. In other words, the first outer link plate 10 and the second outer link plate 12 independently rotate while the first tool pot 21 itself does not rotate.

Meanwhile, the first inner link plate 11 located upstream from the change position 75 does not bend by the rotation stop hole 11b while the second inner link plate 13 that is cooperative with the first inner link plate 11 does not also bend.

The tool change device 70 changes a tool holder held in the first tool pot 21 or the second tool pot 22 placed in the change position 75 to a tool holder attached to the spindle. Since the first tool pot 21 and the second tool pot 22 that are placed in the change position 75 do not rotate, a change in the phase around the axis does not occur, which can prevent a misalignment around the axis between the hand 72 and the tool. This can also prevent a misalignment between the spindle and the tool.

In FIGS. 5 and 6, though the tool change device 70 is disposed so as to be opposed to the position where the conveyance chain 1 and the sprocket 40 start to be engaged, it may be disposed so as to be opposed to any position in the periphery of the sprocket 40 where the conveyance chain 1 is engaged.

In the conveyance chain 1, the tool change system and the link plates according to Embodiment 1, in the case where the conveyance chain 1 is laid across the sprocket 40, and the first inner link plates 11 and the first outer link plates 10 travel around the sprocket 40, the first inner link plate 10 rotates around the rotation permit hole 10a. The first tool pot 21 is inserted through the rotation stop hole 11b of the first inner link plate 11, so that the first tool pot 21 and the first inner link plate 11 do not relatively rotate. Meanwhile, the first tool pot 21 is inserted through the rotation permit hole 10a of the first outer link plate 10, so that the first tool pot 21 and the first outer link plate 10 relatively rotate. The first tool pot 21 is stopped to rotate by the rotation stop hole 11b of the first inner link plate 11, so that the first outer link plate independently rotates without rotating the first tool pot 21.

Furthermore, the first inner link plate 11 also rotates around the rotation permit hole 11a. The second tool pot 22 is inserted through the rotation stop hole 10b of the first outer link plate 10, so that the second tool pot 22 and the first outer link plate 10 do not relatively rotate. Meanwhile, the second tool pot 22 is inserted through the rotation permit hole 11a of the first inner link plate 11, so that the second tool pot 22 and the first inner link plate 11 relatively rotate. The second tool pot 22 is stopped to rotate by the rotation stop hole 10b of the first outer link plate 10, so that the first inner link plate 11 independently rotates without rotating the second tool pot 22. This makes it possible to prevent a change in phase around the axis of each of the tool pots 2.

Moreover, the second outer link plate 12 and the second inner link plate 13 are respectively formed with only the rotation permit holes 12a and the rotation permit holes 13a. The formation of the rotation permit holes 12a and 13a is easier than that of the rotation stop holes 10b and 11b, which can reduce manufacturing costs. If the second outer link plate 12 and the second inner link plate 13 are formed with respective rotation stop holes, this necessitates accurate positioning between the formed rotation stop holes and the rotation stop holes 10b and 11b of the first outer link plate 10 and the first inner link plate 11. The formation of only the rotation permit holes 12a and 13a eliminates the need for accurate positioning.

The change in phase around the axis of the tool pot 2 is prevented, which keeps the phase of the tool pot 2 around the axis unchanged relative to the operation unit 8 fixed at a position spaced from the tool pot 2 in the case where the conveyance chain 1 travels around the sprocket 40. The phase of the pin 6 attached to the tool pot 2 is also unchanged, which causes no misalignment between the pin 6 and the operation unit 8 and can keep the pin 6 opposite to the operation unit 8.

The first hole 51 is formed at a position radially separated from the axis of the tool pot 2, and the pin 6 is inserted in the first hole 51. If the phase of the tool pot 2 is changed from the original phase, the phase of the first hole 51 and the pin 6 are also changed, which hinders the opposed arrangement of the pin 6 and the operation unit 8. In Embodiment 1, the phase of the tool pot 2 around the axis is unchanged from the original phase, which maintains the opposed arrangement of the pin 6 and the operation unit 8.

In addition, even in the case where the conveyance chain 1 travels around the sprocket 40, the phase of the tool pot 2 around the axis in the change position 75 is not changed. This makes the phase of the tool held in the tool pot 2 unchanged, which can prevent a misalignment between the hand 72 and the tool, for example, and can also prevent a misalignment between the spindle and the tool, achieving a smooth change of tools.

Embodiment 2

Figure 7:
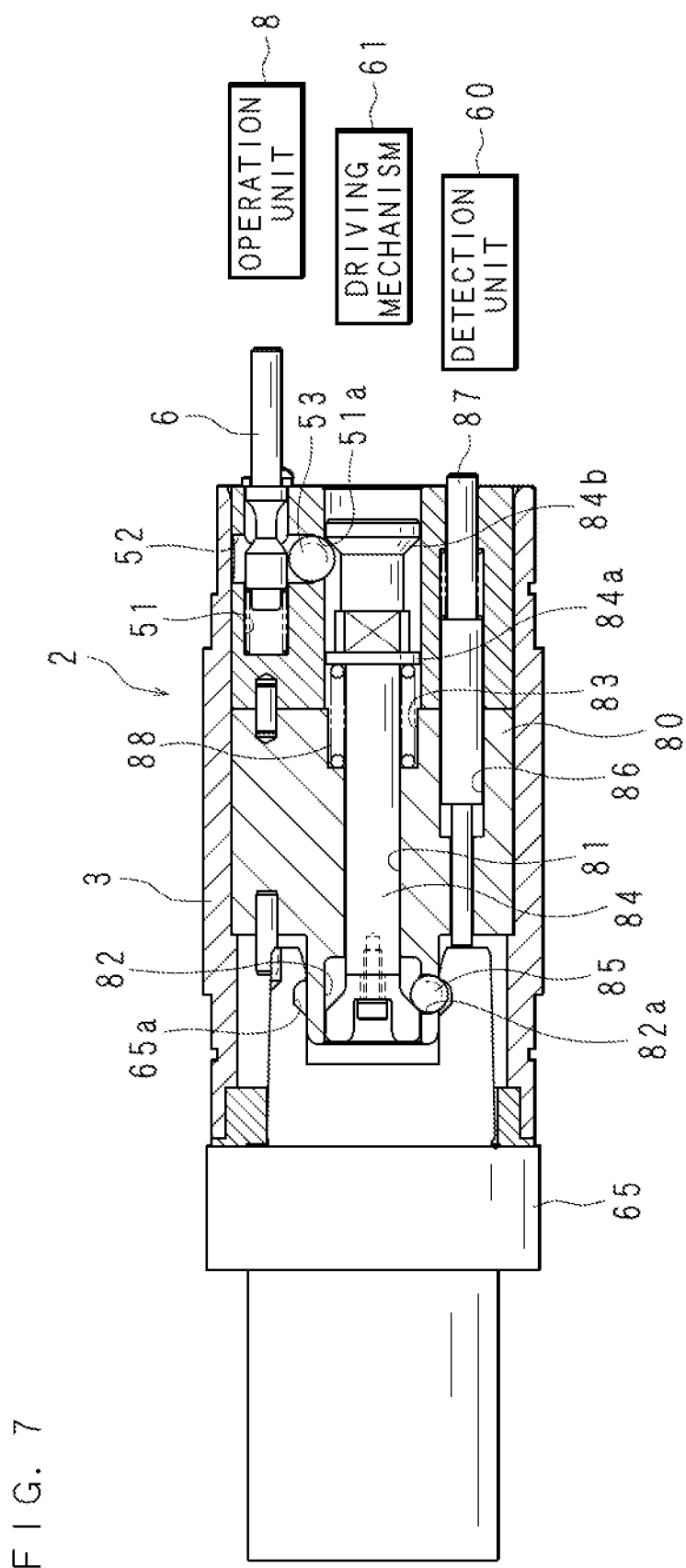
FIG. 7 is a cross-sectional view illustrating a conveyance chain and a tool pot of the tool change system according to Embodiment 2.

A present invention will be described below with reference to the drawings illustrating a conveyance chain 1 and a tool change system according to Embodiment 2. FIG. 7 is a cross-sectional view schematically illustrating a conveyance chain 1 and a tool pot 2 of the tool change system. The tool pot 2 in Embodiment 2 holds a two-face contact tool holder 65 and is inserted through the rotation permit holes 10a-13a and the rotation stop holes 10b and 11b of the first outer link plate 10, the first inner link plate 11, the second outer link plate 12 and the second inner link plate 13 similarly to Embodiment 1.

The tool pot 2 has a cylinder 3, through which a cylindrical support portion 80 is inserted. A passageway 81 formed at the axis part of the support portion 80 penetrates in the axial direction. At one end of the passageway 81, a ball chamber 82 is formed. The ball chamber 82 has a larger diameter than that of the passageway 81. The ball chamber 82 has a throughhole 82a. At the other end of the passageway 81, a storage chamber 83 for storing an elastic member 88 therein is formed. The storage chamber 83 has a larger diameter than that of the passageway 81.

A rod 84 being axially movable is inserted in the passageway 81. One end of the rod 84 is located in the ball chamber 82. The one end of the rod 84 is formed to increase its diameter toward the tip edge. The ball chamber 82 stores a second ball 85 therein, and the second ball 85 is located between the one end of the rod 84 and a side surface of the ball chamber 82. If the rod 84 moves to the other end side, the large-diameter portion of the rod 84 formed at the one end thereof presses the second ball 85 to cause a part of the second ball 85 to outwardly project from the throughhole 82*a*.

The other end of the rod 84 is provided with a flange 84*a*, and the flange 84*a* is located in the storage chamber 83. Between the flange 84*a* and the side wall of the storage chamber 83 on the second ball side 85, an elastic member 88 is provided around the periphery of the rod 84. The elastic member 88 applies a force to the flange 84*a* to the opposite side of the second ball 85. By the force applied by the elastic member 88, the one end of the rod 84 pushes the second ball 85 to cause a part of the second ball 85 to outwardly project from the throughhole 82*a*. The other end of the rod 84 is provided with a pull stud 84*b*. The pull stud 84*b* is disposed so as to be opposed to a driving mechanism 61 in the axial direction. The driving mechanism 61 can push the pull stud 84*b* toward the second ball 85 side.

The rear end of the support portion 80 is provided with the first hole 51, the second hole 52, the pin 6, the ball 53, etc. A part of the ball 53 projects from the first hole 51 and is engaged with the pull stud 84*b*. The support portion 80 is provided with a second passageway 86 that penetrates in the axial direction. The second passageway 86 is located at a position radially separated from the axis of the tool pot 2. The second passageway 86 is provided with a detection pin 87 being axially movable. One end of the detection pin 87 projects toward the second ball 85 side. The other end of the detection pin 87 is opposed to a detection unit 60 for detecting the approach of the detection pin 87. The detection unit 60 is provided at a position spaced from the tool pot 2.

Description is made for holding the two-face contact tool holder 65. The pin 6 is pushed by the operation unit 8. This releases the engagement of the pull stud 84*b* with the ball 53. The pull stud 84*b* is pushed by the driving mechanism 61. This causes the rod 84 to move to the second ball 85 side against the force applied by the elastic member 88 of the rod 84, which prevents the second ball 85 from being pushed by the rod 84.

The tool holder 65 is inserted in the cylinder 3 from the second ball 85 side. The edge portion of the tool holder 65 is cylindrical and formed with an annular groove 65*a* on its inner peripheral surface. The groove 65*a* is radially opposed to the throughhole 82*a*. The edge portion of the tool holder 65 presses the one end of the detection pin 87, to cause the other end of the detection pin 87 to project from the support portion 80. The detection pin 87 approaches the detection unit 60. The detection unit 60 senses the approach of the detection pin 87 and detects that the tool holder 65 is inserted in the tool pot 2.

The press of the pull stud 84*b* by the driving mechanism 61 is released to cause the rod 84 to move to the driving mechanism 61 side by the force applied by the elastic member 88. The second ball 85 is pressed by the one end of the rod 84 to cause a part of the second ball 85 to project through the throughhole 82*a* and to engage with the groove 65*a* of the tool holder 65, which allows the tool holder 65 to be held. Furthermore, the operation unit 8 pulls the pin 6 to cause the pin 6 to press the ball 53. Thus, a part of the ball 53 projects from the first hole 51 to engage with the pull stud 84*b*.

In the conveyance chain 1, the tool change system and the link plates according to Embodiment 2, the change in phase around the axis of the tool pot 2 is prevented, which keeps the phase of the tool pot 2 around the axis unchanged relative to the detection unit 60 fixed at a position spaced from the tool pot 2 in the case where the conveyance chain 1 travels around the sprocket 40. The phase of the detection pin 87 attached to the tool pot 2 is also unchanged, which causes no misalignment between the detection pin 87 and the detection unit 60 and can maintain the opposed arrangement of the detection pin 87 and the detection unit 60.

The second passageway 86 is located at a position radially separated from the axis of the tool pot 2, and the detection pin 87 is inserted in the second passageway 86. If the phase of the tool pot 2 is changed from the original phase, the phase of the second passageway 86 and the detection pin 87 is also changed, which hinders the opposed arrangement of the detection pin 87 and the detection unit 60. In Embodiment 2, the phase of the tool pot 2 around the axis is unchanged from the original phase, which maintains the opposed arrangement of the detection pin 87 and the detection unit 60. Note that the opposed arrangement of the pin 6 and the operation unit 8 is also maintained.

In Embodiment 2, same parts as those of Embodiment 1 are denoted by the same reference codes and are not described in detail here.

It is to be noted that, as used herein and in the appended claims, the singular forms "a", "an", and "the" include plural referents unless the context clearly dictates otherwise.

It is to be understood that the embodiments disclosed here are illustrative in all respects and not restrictive. The technical features described in respective embodiments can be combined, and all changes that fall within meets and bounds of the claims, or equivalence of such meets and bounds are therefore intended to be embraced by the claims.

DESCRIPTION OF REFERENCE NUMERALS 1 conveyance chain
2 tool pot
21 first tool pot
22 second tool pot
10 first outer link plate
11 first inner link plate
12 second outer link plate
13 second inner link plate
10*a*, 11*a*, 12*a* and 13*a* rotation permit hole
10*b* and 11*b* rotation stop hole
6 pin
8 operation unit
40 sprocket
60 detection unit
70 tool change device
87 detection pin

What is claimed is:

1. A conveyance chain comprising:
a plurality of link plates that are alternately coupled and that convey a plurality of tool pots, each of the plurality of tool pots holding a respective tool, wherein
the plurality of link plates includes first inner link plates and first outer link plates, each of the first inner link plates and each of the first outer link plates including a respective rotation stop hole that stops a rotation of a given tool pot of the plurality of tool pots, and each of the first inner link plates and each of the first outer link plates further including a respective rotation permit hole that is located upstream from the corresponding rotation stop hole with respect to a conveyance direction of the conveyance chain, each of the respective rotation permit holes permitting a rotation of a given tool pot of the plurality of tool pots, the plurality of tool pots includes a first tool pot and a second tool pot among the plurality of tool pots, the first tool pot is inserted through the rotation stop hole of one of the first inner link plates and through the rotation permit hole of one of the first outer link plates, and adjacent to the first tool pot, the second tool pot is inserted through the rotation permit hole of one of the first inner link plates and through the rotation stop hole of one of the first outer link plates.

2. The conveyance chain according to claim 1, wherein the plurality of link plates further include second inner link plates and second outer link plates that are respectively opposed to the first inner link plates and to the first outer link plates, each of the second inner link plates and each of the second outer link plates includes a respective second rotation permit hole, each of the second respective rotation permit holes permitting a rotation of a given tool pot of the plurality of tool pots, each tool pot of the plurality of tool pots is inserted through the rotation stop hole of one of the first inner link plates and one of the first outer link plates and is further inserted through the rotation permit hole of the other one of the one of the first inner link plates and the one of the first outer link plates, and each tool pot is further inserted through the second rotation permit hole of one of the second inner link plates and through the second rotation permit hole of one of the second outer link plates.

3. The conveyance chain according to claim 1, wherein each tool pot of the plurality of tool pots comprises a respective axially movable pin, each pin being attached to the corresponding tool pot of the plurality of tool pots at a first predetermined position, and each pin being able to be pushed and pulled by an opposing operation unit, and each tool pot of the plurality of tool pots further comprises a respective axially movable detection pin, each detection pin being attached to the corresponding tool pot of the plurality of tool pots at a second predetermined position, and each detection pin being able to have an approach thereof detected by an opposing detection unit.

4. A tool change system, comprising:

the conveyance chain according to claim 1;

a sprocket across which the conveyance chain is laid; and a tool changer that changes a tool conveyed by the conveyance chain, wherein the tool changer changes the tool when the tool and the tool pot corresponding to the tool are conveyed by the conveyance chain into a tool change position.

5. A plurality of link plates that form a conveyance chain to convey a plurality of tool pots, each of the plurality of tool pots holding a respective tool, wherein the plurality of link plates includes inner link plate plates and outer link plate plates, each of the inner link plates and each of the outer link plates including a respective rotation stop hole that stops a rotation of a given tool pot of the plurality of tool pots, and each of the inner link plates and each of the outer link plates further including a respective rotation permit hole that is located upstream from the corresponding rotation stop hole with respect to a conveyance direction of the conveyance chain, each of the respective rotation permit holes permitting a rotation of a given tool pot of the plurality of tool pots, the plurality of tool pots includes a first tool pot and a second tool pot among the plurality of tool pots, the first tool pot is inserted through the rotation stop hole of one of the inner link plate plates and through the rotation permit hole of one of the outer link plate plates, and adjacent to the first tool pot, the second tool pot is inserted through the rotation permit hole of one of the inner link plate plates and through the rotation stop hole of one of the outer link plates.

* * * * *